United States Patent
Kinstler (10) Patent No.: US 8,910,378 B2
(45) Date of Patent: Dec. 16, 2014

(54) METHOD FOR WORKING OF COMBUSTOR FLOAT WALL PANELS

(75) Inventor: Monika D. Kinstler, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 324 days.

(21) Appl. No.: 13/461,283

(22) Filed: May 1, 2012

(65) Prior Publication Data

US 2013/0291382 A1 Nov. 7, 2013

(51) Int. Cl.
*B21K 25/00* (2006.01)

(52) U.S. Cl.
USPC .......... 29/889.2; 29/889.1; 29/890.02

(58) Field of Classification Search
CPC .......... Y02T 50/675; Y02T 50/67; F23R 2900/00019; F23R 3/002; F23R 3/08; B23P 2700/13; B23P 6/005
USPC ................. 29/889.2, 889.1, 890.02
See application file for complete search history.

(56) References Cited

U.S. PATENT DOCUMENTS

| | | | |
|---|---|---|---|
| 4,302,941 A * | 12/1981 | DuBell | 60/757 |
| 4,695,247 A * | 9/1987 | Enzaki et al. | 431/352 |
| 4,864,827 A * | 9/1989 | Richardson et al. | 60/756 |
| 5,461,866 A * | 10/1995 | Sullivan et al. | 60/757 |
| 5,542,246 A * | 8/1996 | Johnson et al. | 60/804 |
| 6,345,441 B1 * | 2/2002 | Farmer et al. | 29/889.1 |
| 6,408,628 B1 * | 6/2002 | Pidcock et al. | 60/752 |
| 6,532,656 B1 * | 3/2003 | Wilkins et al. | 29/889.1 |
| 6,581,285 B2 | 6/2003 | Emilianowicz | |
| 6,901,758 B2 * | 6/2005 | Grady et al. | 60/752 |
| 6,904,676 B2 * | 6/2005 | Emilianowicz | 29/890.01 |
| 6,984,102 B2 * | 1/2006 | Bunker et al. | 415/115 |
| 6,986,201 B2 * | 1/2006 | Moertle et al. | 29/890.01 |
| 6,994,920 B2 * | 2/2006 | Trewiler | 428/670 |
| 7,546,684 B2 | 6/2009 | Caldwell et al. | |
| 7,886,540 B2 | 2/2011 | Webb | |
| 2009/0271984 A1 | 11/2009 | Hasselberg et al. | |

FOREIGN PATENT DOCUMENTS

GB    719380    11/1950

OTHER PUBLICATIONS

International Search Report and Written Opinion for related International Application No. PCT/US13/36284; report dated Jul. 16, 2013.

* cited by examiner

*Primary Examiner* — David Bryant
*Assistant Examiner* — Ruth G Hildalgo-Hernande
(74) *Attorney, Agent, or Firm* — Miller, Matthias & Hull LLP (57) ABSTRACT

A method for working or repairing a combustor wall panel that may be damaged is disclosed. The method comprises providing a supplemental body to a combustor float wall panel, and attaching at least one cooling pin to the supplemental body.

19 Claims, 7 Drawing Sheets

Fig. 7

METHOD FOR WORKING OF COMBUSTOR FLOAT WALL PANELS

FIELD OF THE DISCLOSURE

The present disclosure relates generally to gas turbine engines and, more particularly, to a method for working combustor float wall panels of a gas turbine engine.

BACKGROUND OF THE DISCLOSURE

The combustor of a gas turbine engine mixes and ignites compressed air with fuel, generating hot combustion gases. These hot combustion gases are then directed by the combustor to the turbine section of the engine where power is extracted from the hot gases. The walls of a combustor are lined with float wall panels that protect the body of the combustor liner from damage due to exposure with the hot gases.

Each float wall panel has several cooling pins to offset the float wall panel from the combustor wall, providing a channel of airflow for cooling. The cooling pins also provide increased surface area for heat transfer from the float wall panel to the cooling airflow channel. During engine service operation, the combustor has to withstand extremely high temperatures, oxidizing, corrosive and erosive conditions, all of which can damage the float wall panel and cooling pins attached to the float wall panel of the combustor. Typically, when the combustor float wall panel becomes burnt or damaged, it is discarded and replaced with a whole new panel.

Thus, there exists a need for a reliable method to repair combustor float wall panels. This invention is directed to solving this need and others, thus providing a way to repair, or otherwise work, a combustor float wall panel, thereby reducing the costs involved in working or maintaining gas turbine engines.

SUMMARY OF THE DISCLOSURE

According to one embodiment of the present disclosure, a method for working a combustor float wall panel is disclosed. The method may comprise providing a supplemental body of a combustor float wall panel, and attaching at least one cooling pin to the supplemental body.

According to another embodiment, a method for working a combustor float wall panel of a gas turbine engine is disclosed. The method may comprise separating a combustor float wall panel from a combustor of a gas turbine engine, providing a supplemental body to the combustor float wall panel, attaching at least one cooling pin to the supplemental body; and returning the combustor float wall panel to the combustor of the gas turbine engine.

According to yet another embodiment, another method for working a combustor float wall panel is disclosed. The method may comprise cutting out a portion of a combustor float wall panel, filling the area of the combustor float wall panel where the portion was cut out with weld material, blending the contour of the filled area to match the contour of the existing combustor float wall panel, and attaching at least one cooling pin to the filled area, said pin may be longer than the existing cooling pins of the combustor float wall panel. The method may further comprise trimming the at least one cooling pin to match the length of the existing cooling pins.

These and other aspects and features of the disclosure will become more readily apparent upon reading the following detailed description when taken in conjunction with the accompanying drawings.

While the present disclosure is susceptible to various modifications and alternative constructions (i.e. maybe a manufacturing or repair technic), certain illustrative embodiments thereof, will be shown and described below in detail. It should be understood, however, that there is no intention to be limited to the specific embodiments disclosed, but on the contrary, the intention is to cover all modifications, alternative constructions, and equivalents along within the spirit and scope of the present disclosure.

DETAILED DESCRIPTION

Figure 1:
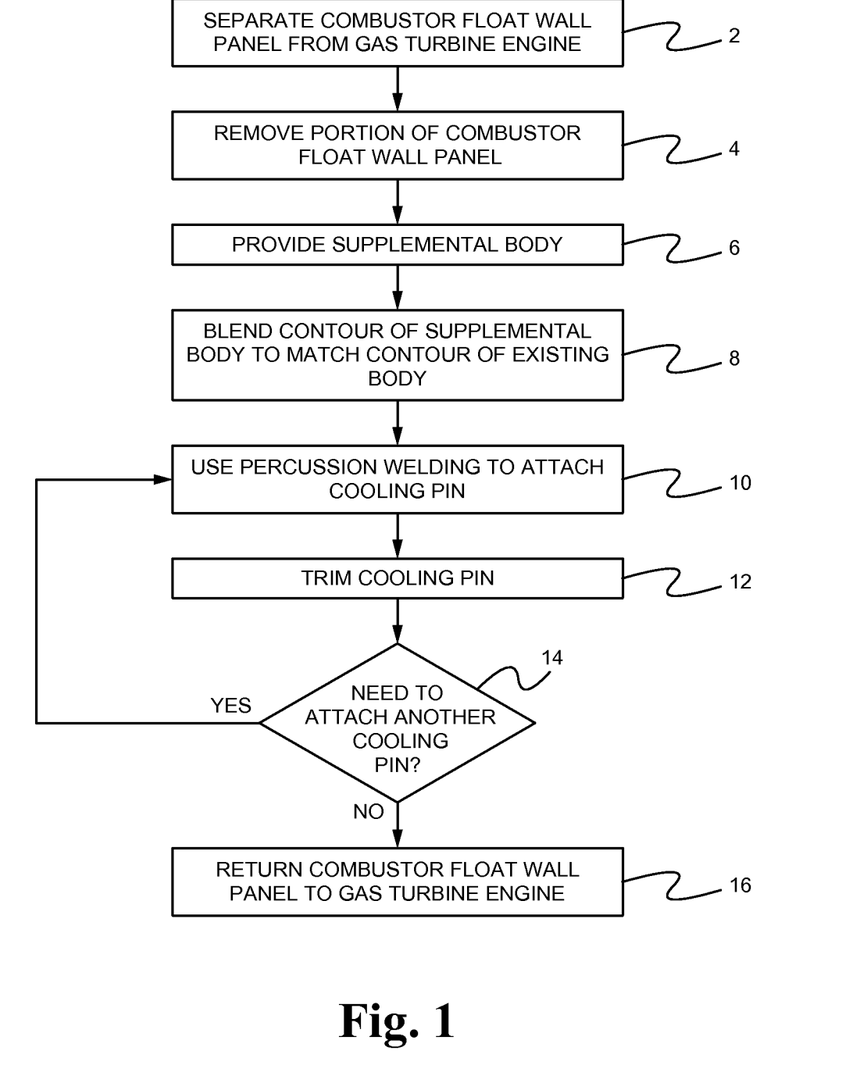
FIG. 1 is an exemplary flowchart outlining the method of working or repairing a combustor float wall panel according to one embodiment of the present disclosure.
Figure 2:
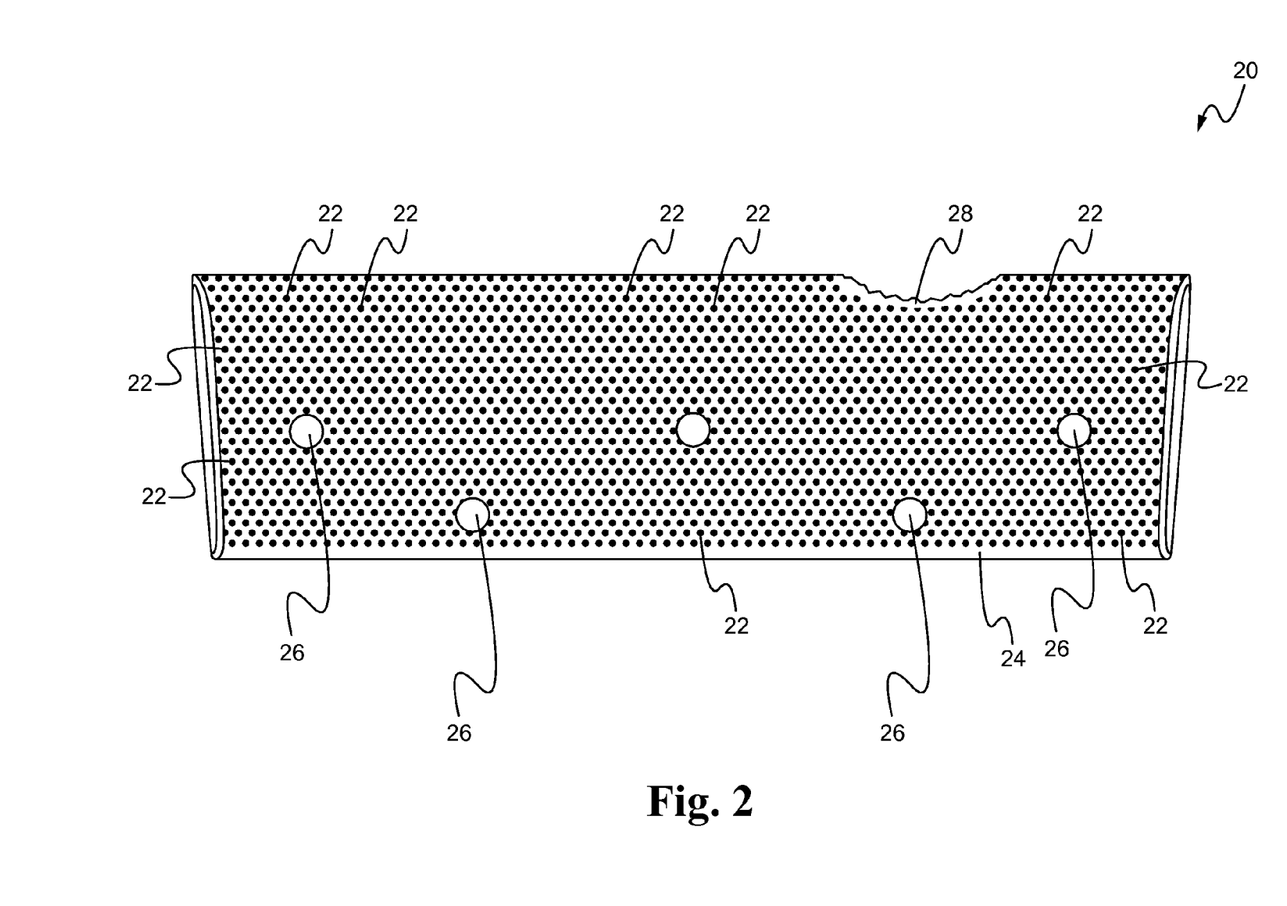
FIG. 2 is a front view of the inner surface of a combustor float wall panel that may be damaged.

Referring now to the drawings, and with specific reference to FIG. 1, in accordance with the teachings of the disclosure, an exemplary flowchart outlining a method for work or repair of a gas turbine engine combustor float wall panel that may be damaged is shown. Starting at step 2, the combustor float wall panel may be separated from the combustor of the gas turbine engine. As shown in FIG. 2, a combustor float wall panel 20 may comprise a plurality of cooling pins 22 extending outwardly from a body 24. For exemplary purposes only, the body 24 of the combustor float wall panel 20 may be made of, including but not limited to, cast nickel based super-alloys, while the cooling pins 22 may be made of, including but not limited to, cast or wrought nickel based alloys. Other materials for the body 24 and cooling pins 22 are certainly possible. The cooling pins 22 may, for example, have a diameter anywhere within the inclusive range of, including but not limited to, 0.020 inches to 0.060 inches and a length anywhere within the inclusive range of, including but not limited to, 0.020 inches to 0.200 inches. By way of example only, each cooling pin 22 may be, including but not limited to, 0.040 inches in diameter and 0.080 inches in length. A plurality of large threaded studs 26 may also extend outwardly from the body 24 for attachment of the combustor float wall panel 20 to the combustor liner (not shown).

Figure 3:
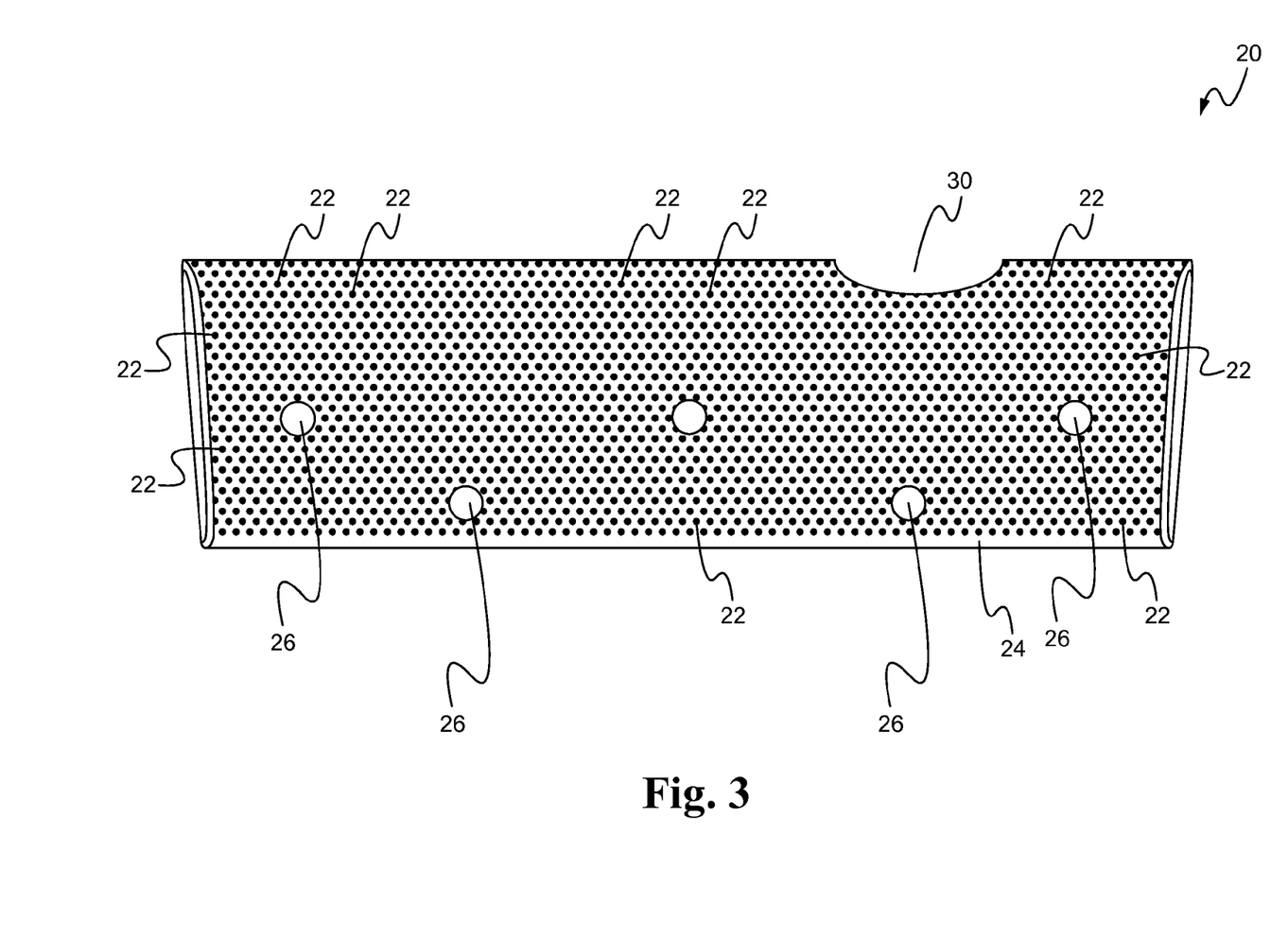
FIG. 3 is a front view of the inner surface of the combustor float wall panel of FIG. 2 with a portion removed.

After engine operation, the combustor float wall panel 20 may incur damage from the burning of the hot combustion gases, resulting in a portion 28. Although portion 28 is shown as a semi-circular shape on the edge of the combustor float wall panel 20, it will be understood that the method of work or repair disclosed herein can be applied to a portion of any shape and any location on the combustor float wall panel 20. At step 4 (in FIG. 1), the portion 28 of the combustor float wall panel 20 may be removed. As shown in FIG. 3, the portion 28 of the combustor float wall panel 20 may be cut out in between the cooling pins such that there is no erosion, corrosion, distressed, or oxidized areas left on the combustor float wall panel 20. After removing the portion 28, what remains is the existing body 24 and the existing cooling pins 22 of the combustor float wall panel 20. In addition, the combustor float wall panel 20 has an area 30 where damage may have occurred and the portion 28 removed. The area 30 may be larger than the area of the portion 28 such that only the existing, parent material of the combustor float wall panel 20 remains. The combustor float wall panel 20 is then worked or repaired by constructing area 30 with a supplemental body and cooling pins. It will be understood that the method disclosed herein may be used for working, manufacturing, and/or repairing a combustor float wall panel 20. Although the combustor float wall panel 20 is described as having possible damage, it will be further understood that the method disclosed herein may be applied to working a combustor float wall panel 20 that is not damaged and may also be applied to manufacturing a new combustor float wall panel.

Figure 4:
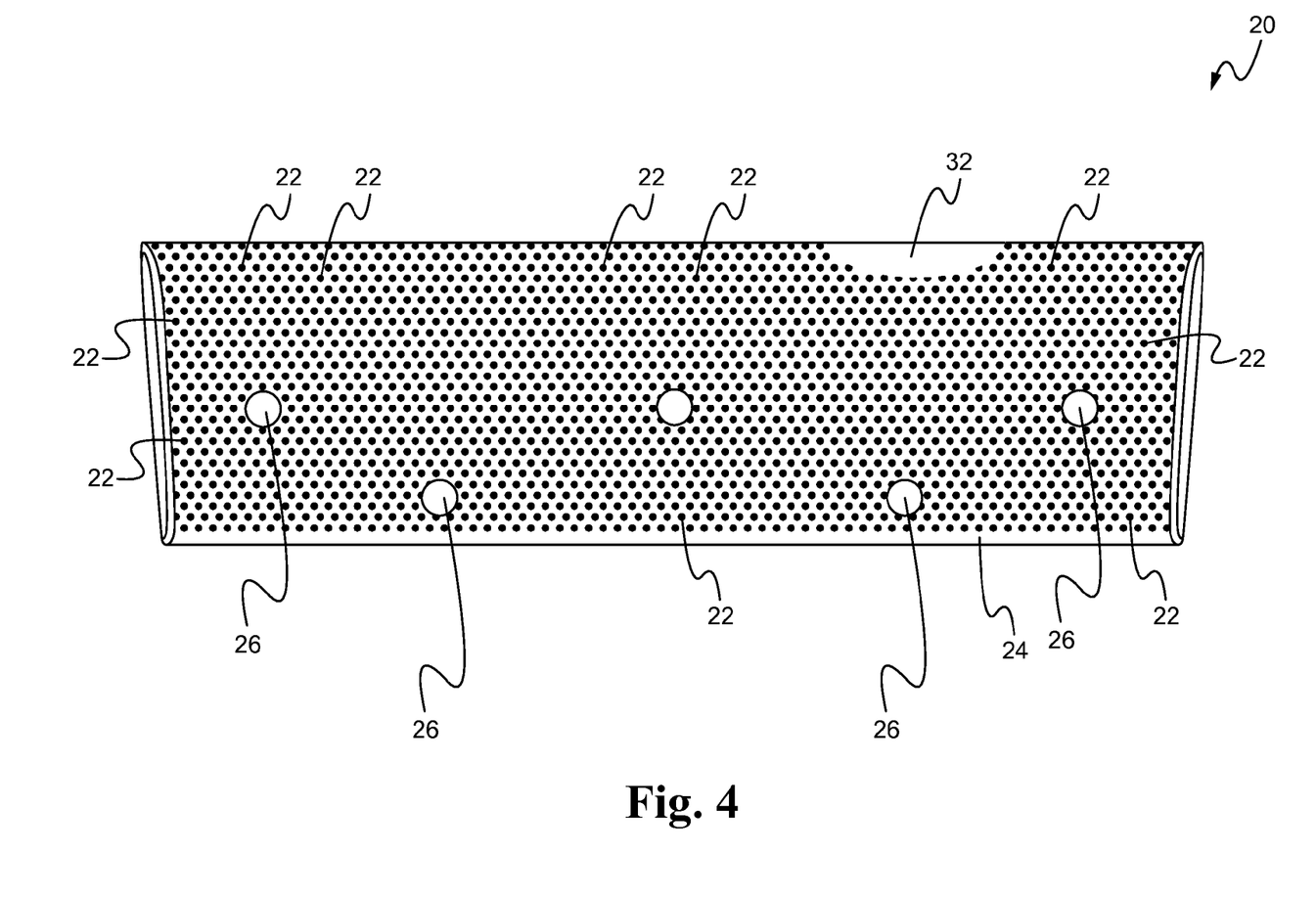
FIG. 4 is a front view of the inner surface of a combustor float wall panel of FIG. 3 with a supplemental body provided.

Referring now to FIG. 4 and step 6 (FIG. 1), a supplemental or replacement body 32 is provided in the area 30 (FIG. 3) of the combustor float wall panel 20 where the portion 28 was removed in order to work or restore the body 24 of the combustor wall panel 20 to its intended shape, size and area. The supplemental body 32 may be provided by filling the area 30 with an appropriate welding filler or material, such as, including but not limited to, nickel or cobalt based alloys, although other materials are certainly possible. Next at step 8 (FIG. 1), the contour of the supplemental body 32 may be blended to match the contour of the existing body 24. For exemplary purposes only, the supplemental body 32 may be blended by a pneumatic hand-held grinder, or other suitable means, such that the contour of the supplemental body 32 is the same as the contour of the existing body 24. Other suitable means of blending may include, but not be limited to, machining.

Figure 5:
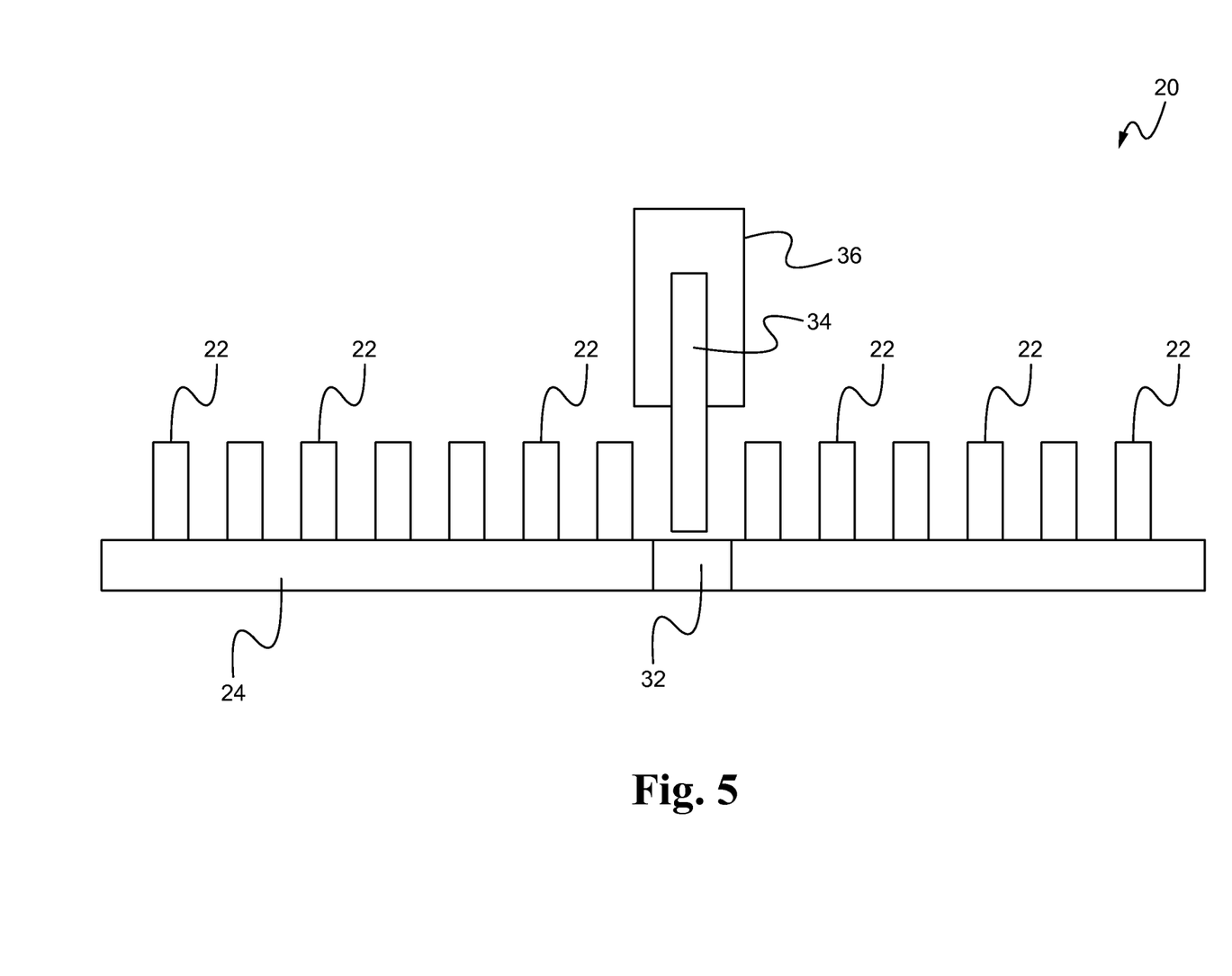
FIG. 5 is a side view of a combustor float wall panel showing the tooling of a percussion welding machine attaching a cooling pin.

Referring now to FIG. 5, after the supplemental body 32 is provided within the combustor float wall panel 20, at least one cooling pin 34 may be attached to the supplemental body 32 at step 10 (FIG. 1). For exemplary purposes only, percussion welding may possibly be used to attach the cooling pin 34 to the supplemental body 32, although other means of attachment are certainly possible. Percussion welding or stud welding is a resistance welding technique used to weld large diameter fasteners to rough thick base metals by creating a high temperature, controlled electric arc between the fastener and base metal to heat the metals to the melting point of their materials. Once the materials of the fastener and base metal become molten, pressure is applied and force expelled to join the two pieces together. The use of percussion welding for micro-applications, such as for the attachment of cooling pins to a combustor float wall panel in this disclosure, is a new and innovative application of the percussion welding technique. The combustor float wall panel 20 may be inserted into a percussion welding machine (not shown). Or in the alternative, percussion welding equipment may be applied to the location of the combustor float wall panel 20. The percussion welding machine may have special tooling 36 for holding and attaching a cooling pin 34 to the supplemental body 32. The special tooling 36 may be adapted for holding and attaching micro-sized parts having the dimensions of a cooling pin with, including but not limited to, anywhere between 0.020 inches to 0.060 inches in diameter and anywhere between 0.020 inches to 0.200 inches in length.

Figure 6:
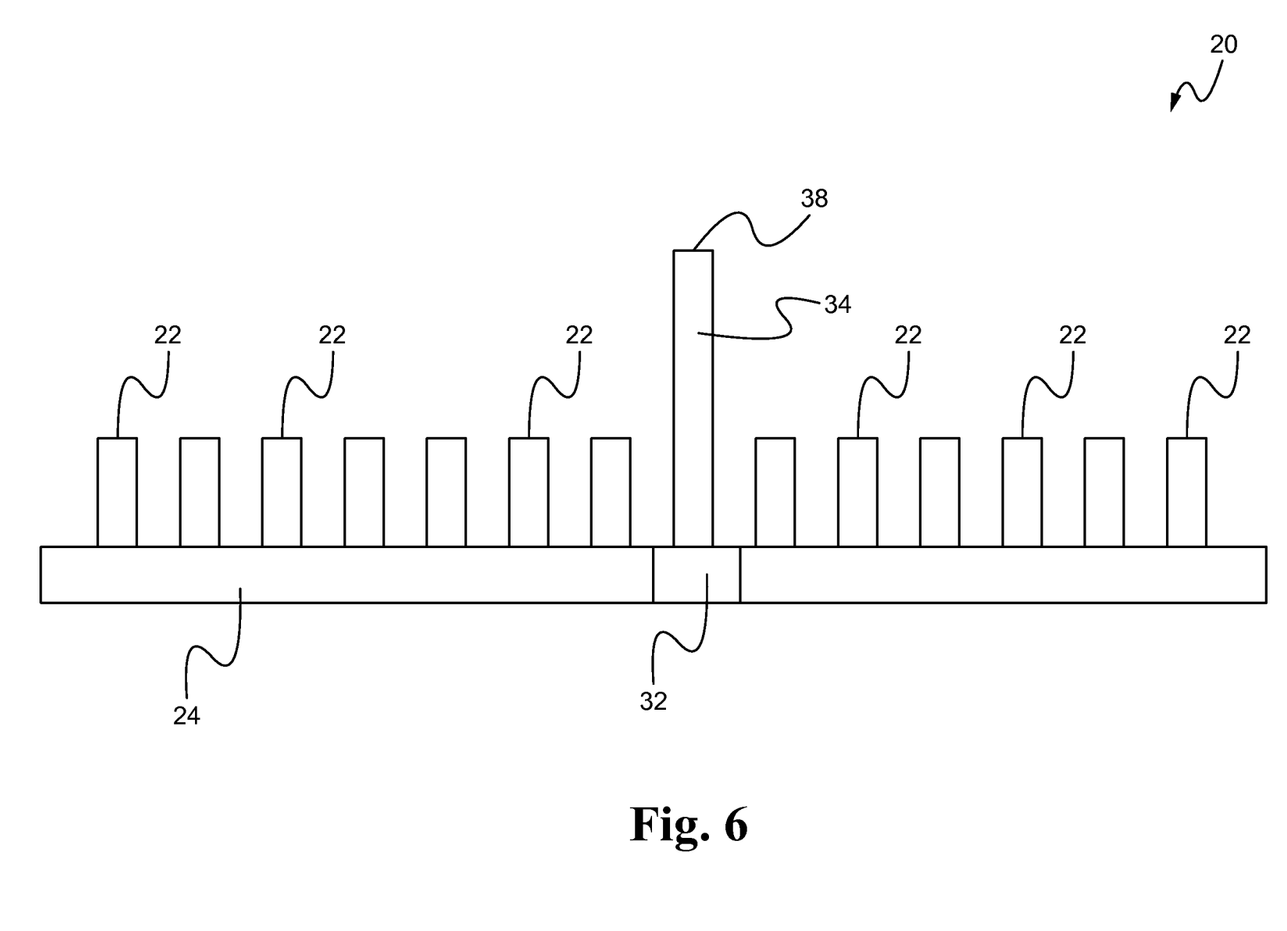
FIG. 6 is a side view of the combustor float wall panel of FIG. 5 with the cooling pin attached.
Figure 7:
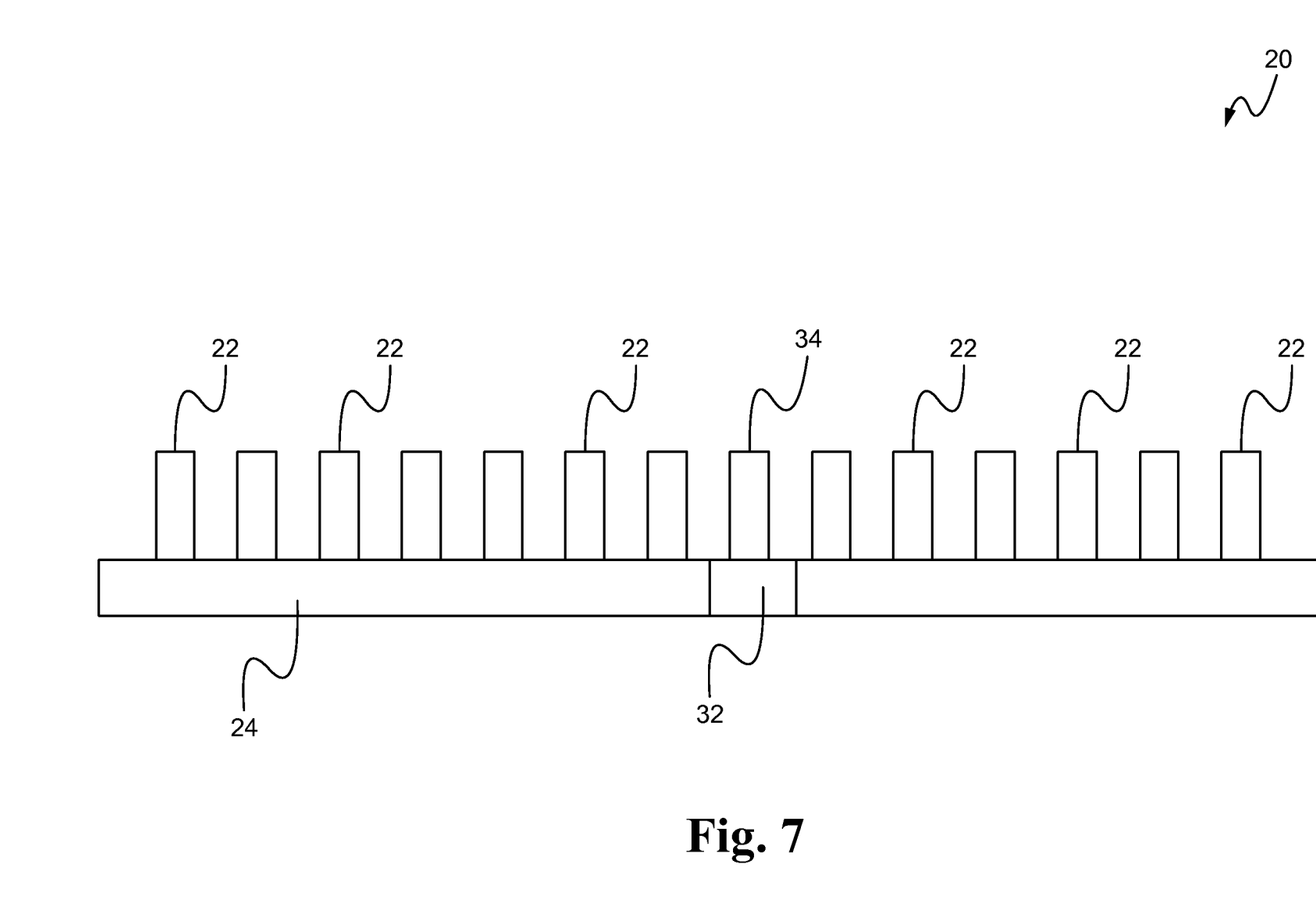
FIG. 7 is a side view of the combustor float wall panel of FIG. 6 with the attached cooling pin trimmed.

Referring now to FIG. 6, the attached cooling pin 34 may have the same diameter as the existing cooling pins 22, but may be longer than the existing pins 22. At step 12 (FIG. 1), after the cooling pin 34 is attached to the supplemental body 32, the attached cooling pin 34 may be trimmed at a top 38 of the pin 34 to match the length of the existing pins 22 on the combustor float wall panel 20. As shown in FIG. 7, the attached cooling pin 34 is trimmed such that the length of the pin 34 is the same as the length of the existing pins 22. For exemplary purposes only, the pin 34 may be trimmed by using portable grinding equipment, such as, including but not limited to, a pneumatic hand-held grinder. Other suitable means for trimming the attached pin 34 are certainly possible.

At step 14 (FIG. 1), if more cooling pins 34 need to be attached to the supplemental body 32 and/or existing body 24, then steps 10 and 12 may be repeated consecutively. Each cooling pin may be individually attached then trimmed before attaching and trimming another cooling pin. Percussion welding, or other suitable means of attachment, may be used to attach as many cooling pins to the body as needed to construct the area 30 (FIG. 3) such that the combustor float wall panel 20 may be worked to its intended number, design and pattern of cooling pins. The number of cooling pins needed may depend on the size of the area 30 on the combustor float wall panel 20. The placement of the cooling pins 34 on the supplemental body 32 may match the pattern of the existing cooling pins 22 on the existing body 24.

If at step 14, no more cooling pins 34 need to be attached, then work or repair of the area of the combustor float wall panel may be complete. Although not shown or described, the method disclosed herein may also comprise the additional steps of fully or partially removing various protective coatings (for example, a thermal barrier coating, an aluminide coating, etc.) and/or reapplying the various coatings during construction without departing from the scope of this disclosure. In all cases, it is understood that the method disclosed herein results in a solid, whole combustor float wall panel with a fully constructed body and accompanying cooling pins, worked to the intended design requirements. At the last step 16, the worked or repaired combustor float wall panel is then returned to the combustor of the gas turbine engine, where it serves as a thermal barrier for the combustor during engine operation.

Although shown and described as individually attaching then trimming each cooling pin one-by-one repeatedly, it will be understood that a plurality of cooling pins may be attached in one step, either separately or simultaneously, then the plurality of cooling pins subsequently trimmed in a next step without departing from the spirit and scope of the disclosure. Furthermore, although shown and described as having a length longer than the existing pins 22, the cooling pin 34 may have the same exact dimensions, for example diameter and length, as the existing pins 22 prior to attachment to the supplemental body 32, thereby not requiring the attached pins 34 to be trimmed at step 12. In a further teaching of the disclosure, the method of working or repairing a combustor float wall panel described herein may also comprise providing only cooling pins 34 and not a supplemental body 32.

From the foregoing, it is apparent that the disclosure described is a reliable and cost-effective method for working or repairing combustor float wall panels that may be damaged. By innovatively applying the percussion welding technique to the micro-sized pins of a float wall panel, the method described herein provides the ability to attach cooling pins which are essential for providing the airflow channel and heat transfer surface area needed to cool the combustor during engine operation. In so doing, a float wall panel does not have to be discarded but only reconstructed, thereby lowering the overall cost of work, maintenance and repair of gas turbine engines.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto.

What is claimed is:

1. A method for working a combustor float wall panel having an existing cooling pin and a first contour comprising:
adding a supplemental body to the combustor float wall panel, the supplemental body having a second contour, the supplemental body lacking the existing cooling pin; and
attaching at least one second cooling pin to the supplemental body, the at least one second cooling pin being longer than the existing cooling pin.

2. The method of claim 1, further comprising trimming the second cooling pin to match the length to the existing cooling pin, after attachment of the second cooling pin to the supplemental body.

3. The method of claim 1, wherein the float wall panel includes more than one existing cooling pin and further includes the attaching second cooling pins to the supplemental body to match the pattern of the more than one existing cooling pins on the combustor float wall panel, the second cooling pins being longer than the existing cooling pins.

4. The method of claim 1, wherein percussion welding is used to attach the at least one second cooling pin to the supplemental body.

5. The method of claim 1, further comprising blending the second contour of the supplemental body to match the first contour of the combustor float wall panel before attaching the at least one second cooling pin.

6. The method of claim 1, wherein the second cooling pin is between 0.020 inches and 0.060 inches in diameter and between 0.020 inches and 0.200 inches in length.

7. The method of claim 1, further comprising removing a portion of the combustor float wall panel and then adding the supplemental body to the area of the combustor float wall panel where the portion was removed.

8. The method of claim 2, further comprising individually attaching each second cooling pin and then trimming each second cooling pin before attaching and trimming another second cooling pin.

9. The method of claim 2, further comprising attaching a plurality of second cooling pins to the supplemental body and then trimming the plurality of second cooling pins.

10. The method of claim 2, wherein percussion welding is used to attach the at least one second cooling pin to the supplemental body.

11. A method for working a combustor float wall panel of a gas turbine engine comprising:
separating the combustor float wall panel from a combustor of a gas turbine engine, the combustor float wall panel having an existing cooling pin;
adding a supplemental body to the combustor float wall panel, the supplemental body lacking the existing cooling pin;
attaching at least one second cooling pin to the supplemental body, the at least one second cooling pin being longer than the existing cooling pin; and
returning the combustor float wall panel to the combustor of the gas turbine engine.

12. The method of claim 11, wherein percussion welding is used for attachment of the at least one second cooling pin to the supplemental body.

13. The method of claim 11, further comprising trimming the second cooling pin to match the length of the existing cooling pin, after attachment of the second pin to the supplemental body.

14. The method of claim 11, wherein the float wall panel includes more than one existing cooling pin, and the method further comprising using percussion welding to attach second cooling pins to the supplemental body to match the pattern of the existing cooling pins on the combustor float wall panel.

15. The method of claim 11, wherein the second cooling pin is between 0.020 inches and 0.060 inches in diameter and is between 0.020 inches and 0.200 inches in length.

16. The method of claim 11, further comprising removing a portion of the combustor float wall panel and then adding the supplemental body to the area of the combustor float wall panel where the portion was removed.

17. The method of claim 13, further comprising individually attaching each second cooling pin and then trimming each second pin before attaching and trimming another second cooling pin.

18. The method of claim 13, wherein percussion welding is used to attach the at least one second cooling pin to the supplemental body.

19. A method for working a combustor float wall panel having an existing cooling pin comprising:
cutting out a portion of the combustor float wall panel;
filling the area of the combustor float wall panel where the portion was cut out with weld material;
blending the contour of the filled area to match the contour of the existing combustor float wall panel;
attaching at least one second cooling pin to the filled area by percussion welding, the at least one second cooling pin being longer than the existing cooling pin of the combustor float wall panel; and
trimming the at least one second cooling pin to match the length of the existing cooling pin.

* * * * *